US008725472B2

(12) United States Patent  (10) Patent No.: US 8,725,472 B2
Hagelin et al.  (45) Date of Patent: May 13, 2014

(54) ARRANGEMENT AND METHOD FOR GENERATING INFORMATION

(75) Inventors: Hans-Ove Hagelin, Linköping (SE); Johan Ehlin, Linköping (SE)

(73) Assignee: SAAB AB, Linköping (SE)

(*) Notice: Subject to any disclaimer, the term of this patent is extended or adjusted under 35 U.S.C. 154(b) by 805 days.

(21) Appl. No.: 11/898,875

(22) Filed: Sep. 17, 2007

(65) Prior Publication Data

US 2008/0077383 A1  Mar. 27, 2008

(30) Foreign Application Priority Data

Sep. 15, 2006 (EP) .................................. 06120730

(51) Int. Cl.
*G06G 7/48* (2006.01)
*G06G 7/72* (2006.01)
*G09B 19/00* (2006.01)

(52) U.S. Cl.
USPC .................................. 703/6; 434/14; 434/11

(58) Field of Classification Search
USPC ............................. 703/8; 434/5; 342/13, 169
See application file for complete search history.

(56) References Cited

U.S. PATENT DOCUMENTS

| | | | | |
|---|---|---|---|---|
| 5,428,530 A | * | 6/1995 | Brown et al. | 703/8 |
| 5,549,477 A | * | 8/1996 | Tran et al. | 434/5 |
| 6,283,757 B1 | * | 9/2001 | Meghnot et al. | 434/33 |
| 7,194,353 B1 | * | 3/2007 | Baldwin et al. | 701/528 |
| 2003/0215771 A1 | | 11/2003 | Bartoldus et al. | |

FOREIGN PATENT DOCUMENTS

| | | |
|---|---|---|
| EP | 0526969 A2 | 2/1993 |
| EP | 0679857 A1 | 11/1995 |

OTHER PUBLICATIONS

Bui et al. "An agent-based framework for building decision support systems", 1999, Decision Support System 25, pp. 225-237.*
Coombs et al. "Design of a Software Environment for Tactical Situation Development", 1988, 21 pages.*
Momen et al. "Dynamic Decision Support in the Advanced Tactical Architecture for Combat Knowledge System", Jan. 2006, JDMS, vol. 3, Iss. 1, pp. 11-26.*
European Search Report—Sep. 10, 2007.

* cited by examiner

*Primary Examiner* — Suzanne Lo
(74) *Attorney, Agent, or Firm* — Venable LLP; Eric J. Franklin

(57) ABSTRACT

A method for generating input information associated with a question to be provided to a simulation device on-board a platform. The question is elected among a plurality of questions. A simulation criterion corresponding to the simulation is determined. A simulation scenario is modified depending upon the question. The input information is generated depending upon the elected question and the simulation criterion.

21 Claims, 6 Drawing Sheets

ARRANGEMENT AND METHOD FOR GENERATING INFORMATION

CROSS-REFERENCE TO RELATED APPLICATIONS

This application claims priority to European patent application 06120730.4 filed 15 Sep. 2006.

FIELD OF THE INVENTION

The invention relates in general to communication with a simulation device. In particular the invention relates to a device and arrangement for communication with a simulation device provided in a platform. Further, the invention relates to a communication device arranged for generating and inputting information to the simulation device.

The invention also relates to a method for communication with a simulation device. In particular the invention relates to a method for communication with a simulation device provided in a platform. Further, the invention relates to a method for generating and inputting information to the simulation device.

Furthermore, the invention relates to software adapted to perform steps of the communication method when executed on a computer.

BACKGROUND OF THE INVENTION

The present invention relates to situation analysis and choice of tactics onboard a platform, for example a flying platform, such as an airplane, manned or unmanned.

A driver of a platform, e.g. a pilot of an airplane, has to make many decisions in real time to drive in a safe and correct way. Different means for assisting a pilot is typically provided in platforms of today.

The term "situation analysis" relates to the analysis the driver performs in different situations while driving the platform. One situation may be an air plane-to-plane combat situation. Such a situation is generally very stressful and complicated for each involved pilot, seeing that the required analysis of the situation is mentally trying. This especially holds true when the situation is of a jumbly sort, e.g. involving a plurality of hostile airplanes. The driver of the platform must more or less continuously process provided information to perform a mental analysis so as to try to answer relevant questions. Examples of questions may be:
  which of the different airplanes are hostile?
  how threatened is my own airplane by a particular hostile airplane?
  if a hostile target tracking/radar measurement is supposed to be more than one hostile airplane, is the own platform/own group of platforms threatened?

The term "choice of tactics" relates to considerations and choices performed by the driver regarding actions of airplanes within the own group or even only regarding future actions of the own airplane. The driver of the platform must also here, more or less continuously, process provided data so as to perform a mental analysis so as to try to answer relevant questions. Examples of questions may be:
  should a weapon be fired now, later, or not at all?
  should present mission be aborted?
  In a civilian application: If own platform and an approaching airplane continue on course, will there later be a make way situation?

Thus, complex situation analysis and choice of tactics are today duties of the driver. The driver is today performing the situation analysis and the choice of tactics based on information provided by different indicators. There has been proposed that a simulation device may be arranged for performing simulations depending upon posed questions, questions exemplified above. However, during flight in a platform, such as an airplane, inputting of questions in real time, on-line, is related to a variety of practical difficulties, on account of a turbulent environment and stressful situation, for example.

It therefore exist a need to provide means arranged to facilitate the process of inputting questions to a simulation device within a platform, such as an airplane. There also exists a need to provide a standardized procedure for formulating/designing new questions, or modifying already present questions, to make possible for a driver of the platform to interact in an efficient way with the simulation device.

It should be noted that the platform may alternatively be an UAV (Unmanned Aerial Vehicle), wherein an autonomous decision maker needs to be provided with adequate basic data, answers to questions exemplified above, among others.

SUMMARY OF THE INVENTION

An object according to an aspect of present invention is to provide a communication device for posing questions relating to situations analysis and/or choice of tactics to a simulation device within a platform in a user-friendly way.

An object according to an aspect of the present invention is to provide a communication device for posing questions relating to situations analysis and/or choice of tactics, on-line, to a simulation device within a platform.

An object according to an aspect of the present invention is to provide a method and/or a communication device for facilitating a procedure of posing questions to a simulation device within a platform.

Above mentioned problems are solved by an arrangement or device for generating input information associated with a question to be provided to a simulation device on-board a platform, comprising:
  means for electing said question among a plurality of questions;
  means for determining a simulation criterion corresponding to said simulation;
  means for modifying a simulation scenario depending upon said question; and
  means for generating the input information depending upon the elected question and the simulation criterion.

Preferably there is provided a computer programme comprising a programme code for performing the simulation method steps, when said computer programme is run on a computer.

Preferably there is provided computer programme product comprising a program code stored on a computer readable media for performing the simulation method steps, when said computer programme is run on the computer.

Preferably there is provided computer programme product directly storable in an internal memory of a computer, comprising a computer programme for performing the simulation method steps, when said computer programme is run on the computer.

Preferably the simulation criterion is a simulation type.

One positive outcome of the communication device and the method is that more reliable inputting of questions may be performed within a platform during driving of the same, for example flight of an airplane.

The present invention further provides an improved possibility of simulation scenario editing on several different levels, such as entity-, component- and behaviour level.

A beneficial contribution of the invention is that there is no demand regarding coding of software when constructing new questions to be inputted to the simulation device. The communication device is providing a flexible solution to the problem of generating questions relating to an arbitrary simulation.

Another beneficial contribution resulting from application of the method according to the invention is that more complex situations may be managed regarding situation analysis using the method according to the invention. Also, a greater number of situations to be analysed may be managed using the method according to the invention, particularly because a user interface of the communication terminal is easy to use.

Additional objects, advantages and novel features of the present invention will become apparent to those skilled in the art from the following details, as well as by practice of the invention. While the invention is described below, it should be understood that the invention is not limited to the specific details disclosed. A person skilled in the art having access to the teachings herein will recognise additional applications, modifications and embodiments in other fields, which are within the scope of the invention.

BRIEF DESCRIPTION OF THE DRAWINGS

For a more complete understanding of the present invention and further objects and advantages thereof, reference is now made to the examples shown in the accompanying drawings, in which.

QUESTIONS AND SIMULATIONS

Figure 5:
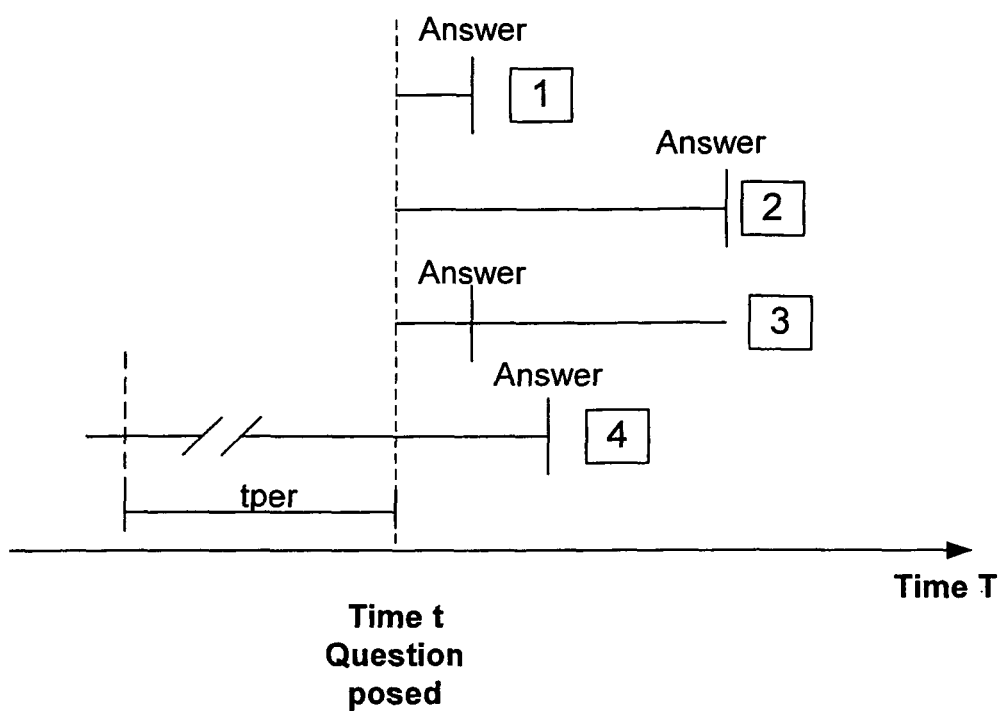
FIG. 5 schematically illustrates an overview of different simulation representations according to an aspect of the present invention.

FIG. 5 schematically illustrates four different types of simulations, each relating to a particular type of question. The respective questions are posed at a time point t. According to one embodiment there are four different types of simulations, which are listed below.
1. Simulation relating to a "static" question in real time;
2. Simulation relating to a "dynamic" question in real time;
3. Simulation relating to a question requiring prediction simulation;
4. Simulation relating to a question requiring estimation of historical data.

An example question of the first simulation type [1] may be—"Is a surrounding platform X within reach of any missile Y of the platform 10?". In other words, "Is it possible to fight a particular entity, such as a potentially hostile fighter, with a particular missile of the platform 10?". This is a static question wherein an answer to the question provided as a direct answer, namely, YES or NO, alternatively N/A. The answer of a question of this type may be presented promptly, i.e. less than a one second (1 s).

An example question of the second simulation type [2] may be—"Is a particular platform X potentially dangerous for this platform 10?". This simulation may comprise a plurality of sub-simulations. For example, to determine if a particular platform X is dangerous for the own platform, a unique set-up of fictive weapon systems of the platform X may be included in each sub-simulation. The simulation (sub simulations) is run in real time and an answer to the posed question is provided after a simulation stop criteria is fulfilled, for example simulation run time of 10, 20 or 30 seconds.

An example question of the third simulation type [3] may be—"Can platform X escape from this platform 10?". This question may have relevance in a fighter-to-fighter combat scenario, for example. A simulation requiring prediction is generally run faster than real time regarding a time point of relevance $t_{rel}$ in the future. The answer to the posed question may be given 2-20 seconds after the question is posed, i.e. 2-20 after time t as indicated in FIG. 5. Preferably, the answer to the posed question is given after Preferably, the answer to the posed question is given after less than one second (1 s). More preferably, the answer to the posed question is given after less than 0.1 second. This simulation type [3] may comprise a plurality of sub-simulations.

An example question of the fourth simulation type [4] may be—"Has the airplane X energized, at the prospect of attacking own platform, since time Y?

This simulation is using "historical" surrounding information so as to perform an estimation process. The answer to the posed question may be provided 2-20 seconds after the question is posed, i.e. 2-20 after time t as indicated in FIG. 5. Alternatively historical information corresponding to a time period $t_{period}$ is used. The time period may be of arbitrary length, for example 10, 45, 90 seconds, or longer. Preferably, the answer to the posed question is provided 1-2 seconds after the time point t.

DETAILED DESCRIPTION OF THE DRAWINGS

Figure 1:
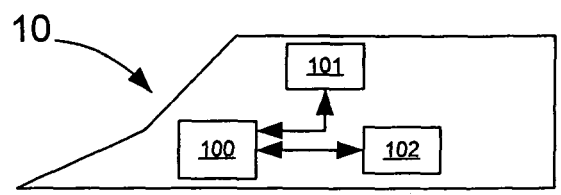
FIG. 1 schematically illustrates a platform according to an aspect of the present invention.

With reference to FIG. 1 a platform 10 is schematically shown. The platform may be an autonomous platform, such as an unmanned aerial vehicle (UAV). The platform may be an airplane, such as a passenger traffic airplane. Alternatively the airplane can be a military aircraft, such as a fighter, bomber, reconnaissance airplane, or a combination thereof. The autonomous platform can also be any kind of a helicopter, robot or missile.

It should be noted that the platform 10 alternatively can be a ground vehicle, water craft or underwater craft, e.g. an automobile, ship or submarine. Alternatively, the platform 10 can be a space craft or a satellite. The platform 10 comprises a simulation device 100, which is depicted in greater detail below.

The platform 10 is provided with a plurality of sensors and meters 101, hereinafter referred to as a set of sensors 101. The platform 10 is also provided with a communication unit 102 having a user interface. The communication unit 102 may comprise a touch-screen, key-pad, computer and/or monitor, for example. The communication unit 102 is also referred to as communication terminal 102. The set of sensors 101 and the communication unit 102 are both arranged for communication with the simulation device 100 as depicted in greater detail below.

Figure 2:
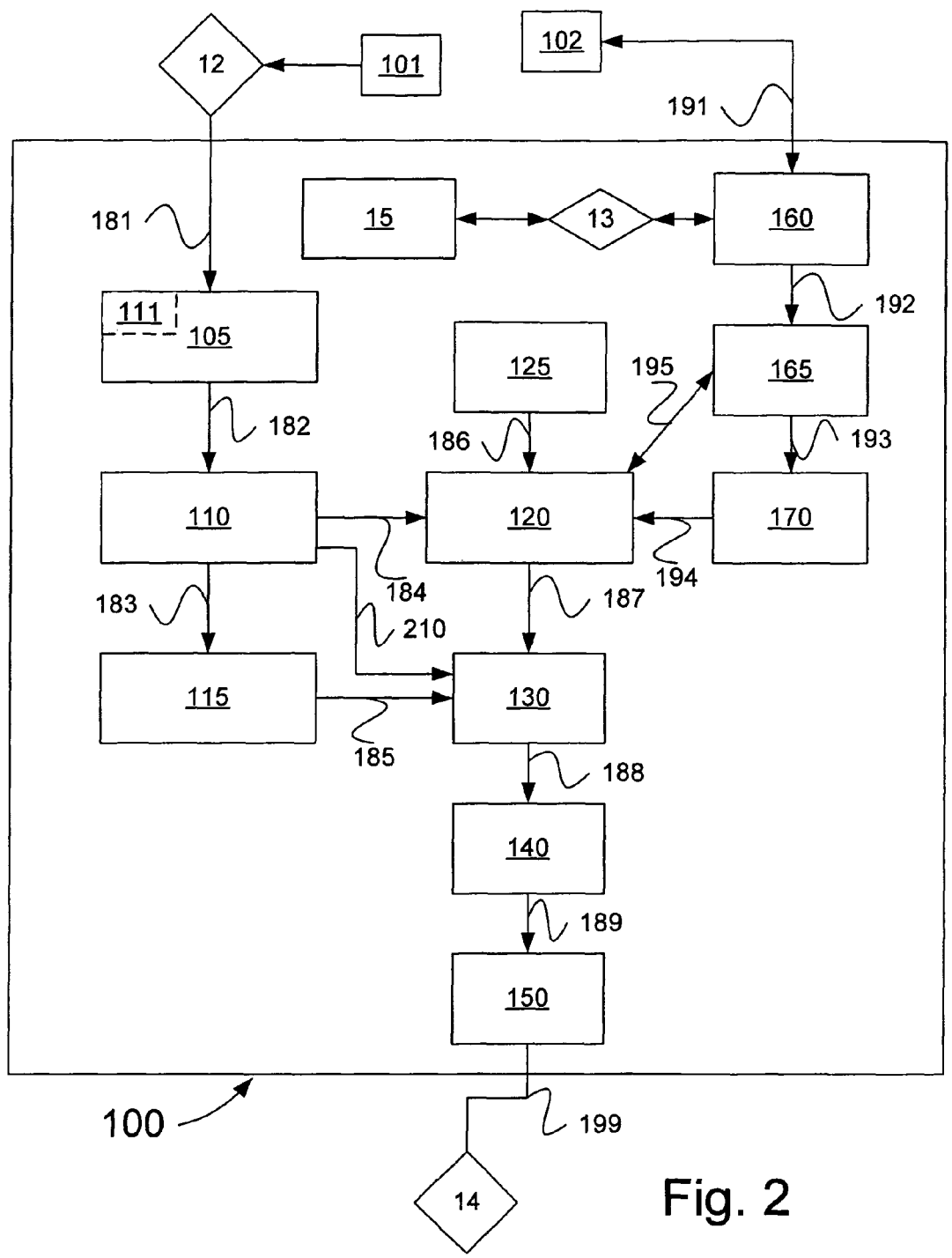
FIG. 2 schematically illustrates an overview of a simulation device.

With reference to FIG. 2 the simulation device 100 is schematically shown. The simulation device 100 is provided in the platform 10. The simulation device 100 is also referred to as simulation arrangement 100.

Hereinafter the term "link" refers to a communication link which may be a physical connector, such as an optoelectronic communication wire, or a non-physical connector such as a wireless connection, for example a radio or microwave link.

The simulation device 100 is connected to the set of sensors 101 and the communication unit 102. The set of sensors 101 comprises a variety of different sensors. The number of sensors is an arbitrary number. Each sensor of the set of sensors is arranged to detect and/or measure at least one parameter and to communicate the sensor parameter information data 12 to the simulation device 100. Schematically shown in FIG. 2 the set of sensors 101 is arranged to communicate sensor parameter information data 12 to the simulation device 100 via a link 181. Each sensor of the set of sensors 101 is arranged for communication with the simulation arrangement 100 by a separate link, respectively. Typical sensors are radar-, IR- and optical sensors. Further, other typical are sensors arranged to measure rudder angles, air pressure, and sensors arranged to provide information from other platform's links, such as a robot link.

The communication unit 102 is may be a touch screen. The touch screen may be provided in a cock-pit of the platform 10. Of course the communication unit may be of a different kind, such as a keypad and corresponding monitor or a voice controlled display unit. Other user communication units which could be used are keyboards, mouse, keypads, handles etc.

The communication unit 102 is arranged to allow inputting of questions to the simulation device 100. The questions are pre-defined questions stored in a memory 15. According to one embodiment the memory 15 is a database. The communication unit 102 is arranged for communication with the memory 15 via a question information requesting unit 160. A user of the simulation device 100, e.g. a driver/pilot of the platform 10, may use the communication unit 102 so as to select questions to be answered by means of a simulation. Preferably questions are chosen and inputted in a sequential manner. The question information requesting unit 160 is arranged to request question data 13 from the memory 15. The question information 13 comprises information required for performing a relevant simulation so as to generate an answer to the posed question. The question information requesting unit is arranged to forward the question data to scenario modifying unit 165, which is depicted in greater detail below.

An updating unit 105 is arranged to receive environment information 12 from the set of sensors 101 via the link 181. The updating unit 105 is alternatively arranged to receive a part of the environment information 12 from an external source (not shown), such as a control tower and/or another platform. The updating unit 105 is arranged to receive environment information 12 from both the set of sensors 101 and the external source simultaneously. The updating unit 105 is arranged to process said received information 12. The updating unit 105 is arranged to process the received information 12 and to update representations of existing registered entities in an environment of the platform 10. The updating process is preformed with regard to for example existence, positions of the entities and velocity vectors of the registered entities and a representation of the platform 10. Herein the term "entities" is synonymous with the term "platform".

An information processing unit 110 is arranged to continuously receive updated information from the updating unit 105 via a link 182. The information processing unit 110 is arranged to provide an environment model, which is continuously generated depending upon received updated information, which is sent from the updating unit 105. The environment model comprises information about the environment of the platform 10. More specifically, the environment model comprises information about existing entities, including the platform 10, having reference to for example existence, type of entities, positions of the entities and corresponding velocity vectors. The information processing unit 110 is arranged to store an updated generated environment model in an internal memory 111 on a regular basis, for example every second. Preferably the information processing unit 110 is arranged to continuously store an updated generated environment model in the internal memory of the information processing unit 110. The latest stored environment model is corresponding to a best current description of the environment of the platform 10. The environment model (EM) also comprises information about spatial data, position, velocities, accelerations, attitudes, angular velocities, angular velocities, and other sensor data, such as e.g. radar signature and optical picture. The environment model also comprises information about different air plane models.

At a moment when an answer to a question is posed, i.e. chosen and inputted (Time t), by means of the communication unit 102, a copy of the latest stored environment model (EM) is made. This copy is transferred to a simulation preparation unit 120 via a link 184 from the information processing unit 110. The simulation preparation unit 120 is arranged to receive and store the copy of the environment model (CEM). The simulation preparation unit 120 is arranged to assign different models to the entities of the received copy of the environment model. According to one embodiment of the invention default models are assigned to the different entities of the received copy of the environment model. A number of default models are stored in a default model storing unit 125, which is arranged for communication with the simulation preparation unit 120 via a link 186. The default model storing unit 125 is arranged to send one or more adequate default models to the simulation preparation unit 120 depending upon a request generated by the simulation preparation unit 120, which request is sent to the model storing unit 125. The default models are applied to the copy of the updated environment model, i.e. the environment model is prepared and processed for the simulation. Choice of default model is depending upon what particular question is posed. According to one embodiment a matching procedure is preformed wherein measured sensor data, for example related to another platform, and pre-stored sensor data is used so as to identify a most appropriate default model. One way to express this procedure is that the updated environment model is "frozen" (copied) at the time when a question is posed by means of the communication unit 102. Information based on the environment model at this time is further sent to the simulation preparation unit 120 so as to constitute the base of a simulation model.

The question information requesting unit 160 is arranged to request and receive question information 13 stored in the memory 15 as a response to a request sent to the memory 15. The memory 15 can alternatively be located external of the simulation device 100. The question data information 13 comprises information relevant for further processing of the question posed by means of the communication terminal 102.

A scenario modification unit 165 is arranged to communicate with the simulation preparation unit 120 via a link 195. The scenario modification unit 165 is arranged to modify a scenario of a simulation relevant for the posed question. This means that entities of the copy of the environment model (CEM) provided in the simulation preparation unit 120 can be modified. Alternatively, entities of the copy of the environment model provided in the simulation preparation unit 120 can be deleted. Alternatively, additional fictive entities may be added to the environment model. According to an embodiment the modification is performed depending upon the particular posed question. According to an embodiment the modification is performed depending upon the particular type of the posed question. This can be performed before or after the one or more default model has been applied to the copy of the environment model.

Each entity of the environment model may be a unique model of a particular predefined platform.

At least one, preferably all, of the representations of the originally detected entities and the added fictive entities can be modified such that a predetermined behavior of the entity can be changed. For example, in case one entity initially is assigned a behavior of an airplane in fighter mode, it can be changed to a behavior of an airplane being in reconnaissance mode.

The scenario modification unit 165 is arranged for communication with a question category information generating unit 170 via a link 193. The question category information generating unit 170 is also referred to as adjustment unit 170. The question category generating unit 170 is arranged for communication with the simulation preparation unit 120 via a link 194. The question category information generating unit 170 is arranged to generate question category information depending upon the type of the posed question. This generated question category information may be used as input information to the simulation preparation unit 120. The question category information is sent to the simulation preparation unit 120 via the link 194. The question category information comprises information about start and stop criterion for the simulation. Further the question category information comprises information about stop criterion, time, predetermined conditions etc. The simulation preparation unit 120 is arranged for communication with a simulation unit 130 via a link 187.

There is provided one predetermined scenario for at least one predetermined question. There is alternatively provided at least one, or a plurality of predetermined scenarios for each at least one predetermined question, respectively.

The information processing unit 110 is arranged for communication with a simulation history information unit 115. The simulation history information unit 115 is arranged to receive simulation information from the information processing unit 110 via a link 183. The received simulation information is stored in the simulation history unit 115. The simulation information comprises information about the updated environment models corresponding to a past time. An arbitrary number of environment models may be stored in the simulation history information unit 115. According to an example arrangement only predetermined parts of the different environmental models may be saved and stored in the simulation history information unit 115 for use in future simulations.

A simulation unit 130 is arranged to perform a simulation process so as to achieve an answer to an inputted question. The simulation process can be of different types, depending upon what type of question is posed. This is depicted in greater detail herein. The simulation unit 130 is arranged to perform simulations for different types of posed questions, for example "static question", "dynamic question", "question requiring prediction simulation" and "question requiring estimation of historical data", according to what is depicted above.

The simulation unit 130 is arranged for communication with a logging unit 140 via link 188. The logging unit 140 is arranged for receiving the simulation result information sent from the simulation unit 130. According to one embodiment of the invention the logging unit 140 is arranged to check stop criterions during the at least one simulation being performed.

The logging unit 140 is arranged for communication with a valuing unit 150 via a link 189. The logging unit 140 is arranged to send the logged simulation result information to the valuing unit 150. The valuing unit 150 is arranged to evaluate the logged simulation result information.

The valuing unit 150 is arranged to output answer information 14 via a link 199. The output answer information 14 is outputted to the communication terminal 102. According to one embodiment, in particular with reference to the question type 2, present status of relevant measurements is also outputted. The answer information 14 is preferably displayed or in any other way communicated to the driver of the platform.

Figures 3A, 3B:
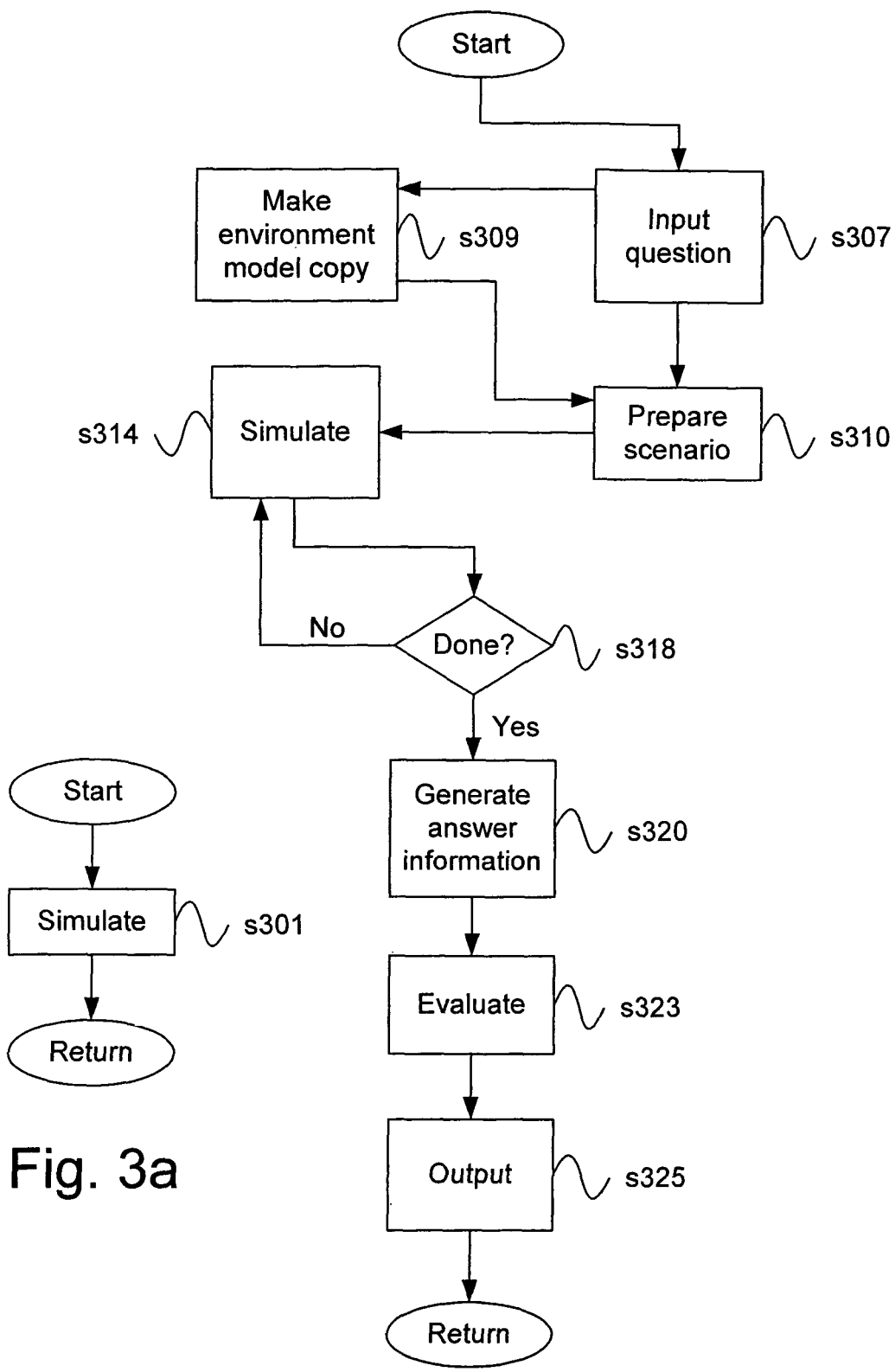
FIG. 3 schematically illustrates in greater detail a simulation method.

FIG. 3 schematically illustrates a simulation method related to the simulation device. The method comprises a first method step s307.

In the method step s307 a driver/pilot of the platform 10 selects a question from a list of predetermined questions and input the same to the simulation device 100 according to the invention. This is depicted in greater detail below. After the method step s307 a subsequent method step s309 is performed.

In the method step s309 a copy is made of a continuously updated environmental model. The copy of the environment model is made depending upon the posed inputted question, i.e. when the question is inputted; a copy is made immediately thereafter. The copy is generated as a direct consequence of the fact that a question is inputted. The copy is made substantially immediately after the posed question is inputted. After the method step s309 a subsequent method step s310 is performed.

In the method step s310 the simulation is prepared. Among other things a scenario of the simulation is prepared. This is performed by applying at least one default model to the environment model. The default model may for example comprise one or more characteristics associated with the representations of the entities in the surroundings of the platform 10. The simulation scenario may be modified regarding the number of entities in the surroundings of the platform, as well as their respective behaviour, performance, equipment, and characteristics, etc. After the method step s310 a subsequent method step s314 is performed.

In the method step s314 the actual simulation is performed. The simulation may be performed in a variety of different ways, of which four are depicted with reference to the herein disclosed simulation examples 1-4 below.

It should be noted that the simulation unit 130 is arranged to perform a plurality of simulations simultaneously, wherein each simulation is relating to one posed question. The simulation unit 130 is arranged to perform a plurality of simulations simultaneously, wherein each simulation is relating to at least one posed question. It should further be noted that the simulation unit 130 is arranged to perform a plurality of sub-simulations simultaneously, wherein each sub-simulation is relating to a posed question, or to an aspect of a posed question.

A loop comprising the method step s318 is continuously performed so as to check whether the simulation is completed or not. This can for example be performed by checking if a preset stop criterion is met. If the simulation is completed a subsequent method step s320 is performed. If the simulation is not completed, the simulation is continued. The method step s318 may be optional.

In the method step s320 answer information is generated. The answer information is generated depending upon the result of the simulation. For example, the answer information may consist of a text string giving the answer to the posed question.

After the method step s320 a subsequent method step s323 is performed. In the method step s323 the result of the simulation is evaluated. Evaluation of the simulation result here means checking validity of the same. This can be performed by a matching procedure so as to determine if the simulation result is reasonable. The matching procedure may involve a comparison between the simulation result and pre-stored predetermined boundary values relevant for a particular posed question and a given scenario modification. The method steps s320 and 323 may be sequentially interchangeable. After the method step s323 a subsequent method step s325 is performed.

In the method step s325 the answer information is outputted. Preferably, the outputted answer information is provided to means for presenting the information, such as a display or a loud speaker, for example. After the method step s325 the method ends.

EXAMPLE 1

This example relates to a simulation regarding a "static" question in real time. In particular with reference to FIG. 2 and FIG. 3a-b, the copy of the environmental model is sent from the updating unit 110 to the simulation preparation unit 120. After scenario editing etc. the simulation is performed in the unit 130 and a valuated simulation result (answer information) is outputted according to the description above.

EXAMPLE 2

This example relates to a simulation regarding a "dynamic" question in real time. In particular with reference to FIG. 2 and FIG. 3a-b, the copy of the environmental model is sent from the updating unit 110 to the simulation preparation unit 120. However, in this case the updating unit 110 is providing the simulation unit 130 with updated information. The updating unit 110 is continuously providing the simulation unit 130 with information associated with updated environment models for use in the actual simulation. The updating unit may be providing the updated information via the link 210 direct to the simulation unit 130. The updated information may be provided to the simulation unit 130 via the simulation preparation unit 120 or the unit 115.

EXAMPLE 3

This example relates to a simulation regarding a simulation relating to a question requiring prediction simulation. The procedure of performing the simulation in this case corresponds to what is depicted with reference to the example 1. Thus, only the environment information provided to the simulation preparation unit 120 as a copy of the updated environment model generated in the updating unit 110 is used as basic information of the simulation.

EXAMPLE 4

This example relates to a simulation regarding a simulation relating to a question requiring estimation of historical data. In this case the unit 115 is providing the simulation unit 130 with history information to be incorporated in the simulation. The history information may be a batch of copies of former updated environment models generated by the updating unit 110. This batch of environment models is relating to a particular passed time period, for example the latest 30 seconds relative a given moment, preferably the time point when the posed question was inputted to the simulation device 100 via the communication unit 102. This time point is also referred to as t, with reference to FIG. 5.

The architecture of the simulation device is thus providing a flexible arrangement for answering to different types of complex posed questions by means of simulations.

Figure 4:
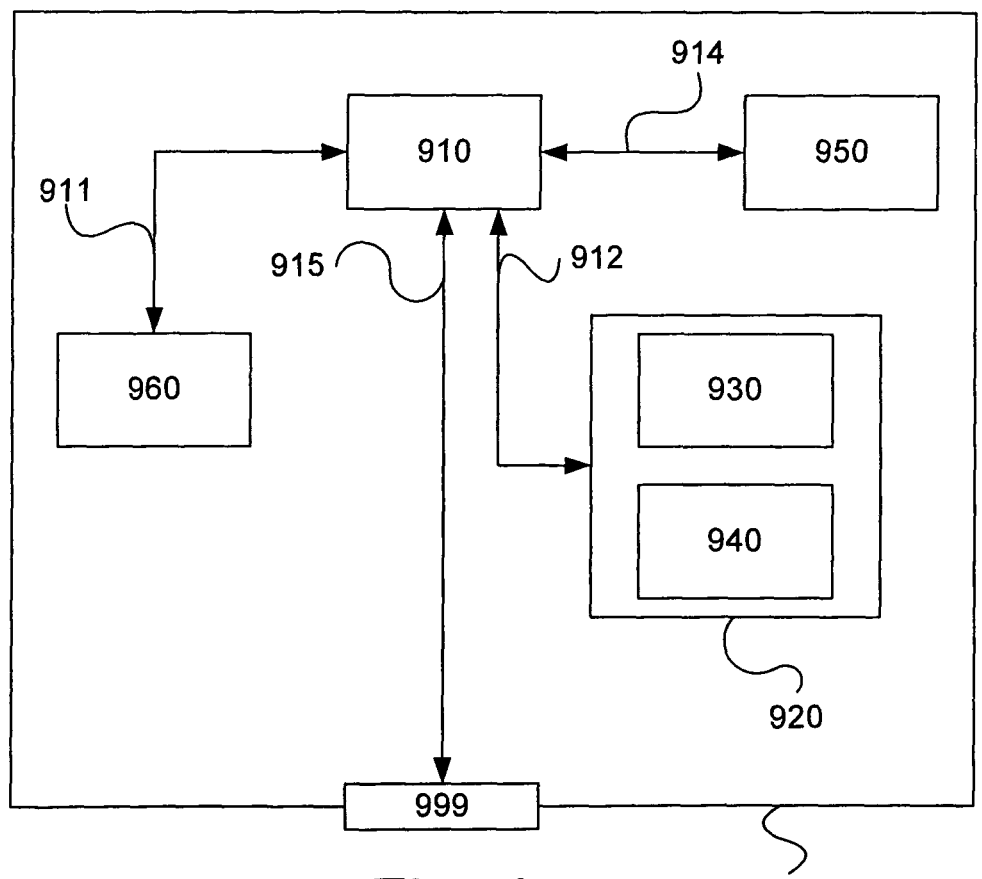
FIG. 4 schematically illustrates an apparatus.

With reference to FIG. 4, a diagram of one embodiment of an apparatus 900 is shown. The communication unit 203 may comprise the apparatus 900. Apparatus 900 comprises a non-volatile memory 920, a data processing device 910 and a read/write memory 950. Non-volatile memory 920 has a first memory portion 930 wherein a computer program, such as an operating system, is stored for controlling the function of apparatus 900. Further, apparatus 900 comprises a bus controller, a serial communication port, I/O-means, an A/D-converter, a time date entry and transmission unit, an event counter and an interrupt controller (not shown). Non-volatile memory 920 also has a second memory portion 940.

A computer program comprising routines for autonomous controlling of control systems of a platform is provided. The program may be stored in an executable manner or in a compressed state in a separate memory 960 and/or in read/write memory 950.

When it is stated that data processing device 910 performs a certain function it should be understood that data processing device 910 performs a certain part of the program which is stored in separate memory 960, or a certain part of the program which is stored in read/write memory 950.

Data processing device 910 may communicate with a data port 999 by means of a data bus 915. Non-volatile memory 920 is adapted for communication with data processing device 910 via a data bus 912. Separate memory 960 is adapted to communicate with data processing device 910 via a data bus 911. Read/write memory 950 is adapted to communicate with data processing device 910 via a data bus 914.

When data is received on data port 999 it is temporarily stored in second memory portion 940. When the received input data has been temporarily stored, data processing device 910 is set up to perform execution of code in a manner described above. According to one embodiment, data received on data port 999 comprises information such as input signals from the user regarding e.g. determination of questions, editing commands, evaluating criterion commands, stop criterion commands. This information can be used by apparatus 900 so as to associate different criterions with particular questions, and/or to start a simulation so as to achieve an answer to a determined posed question, according to the invention.

Parts of the methods described herein can be performed by apparatus 900 by means of data processing device 910 running the program stored in separate memory 960 or read/write memory 950. When apparatus 900 runs the program, parts of the methods described herein are executed.

Figure 6:
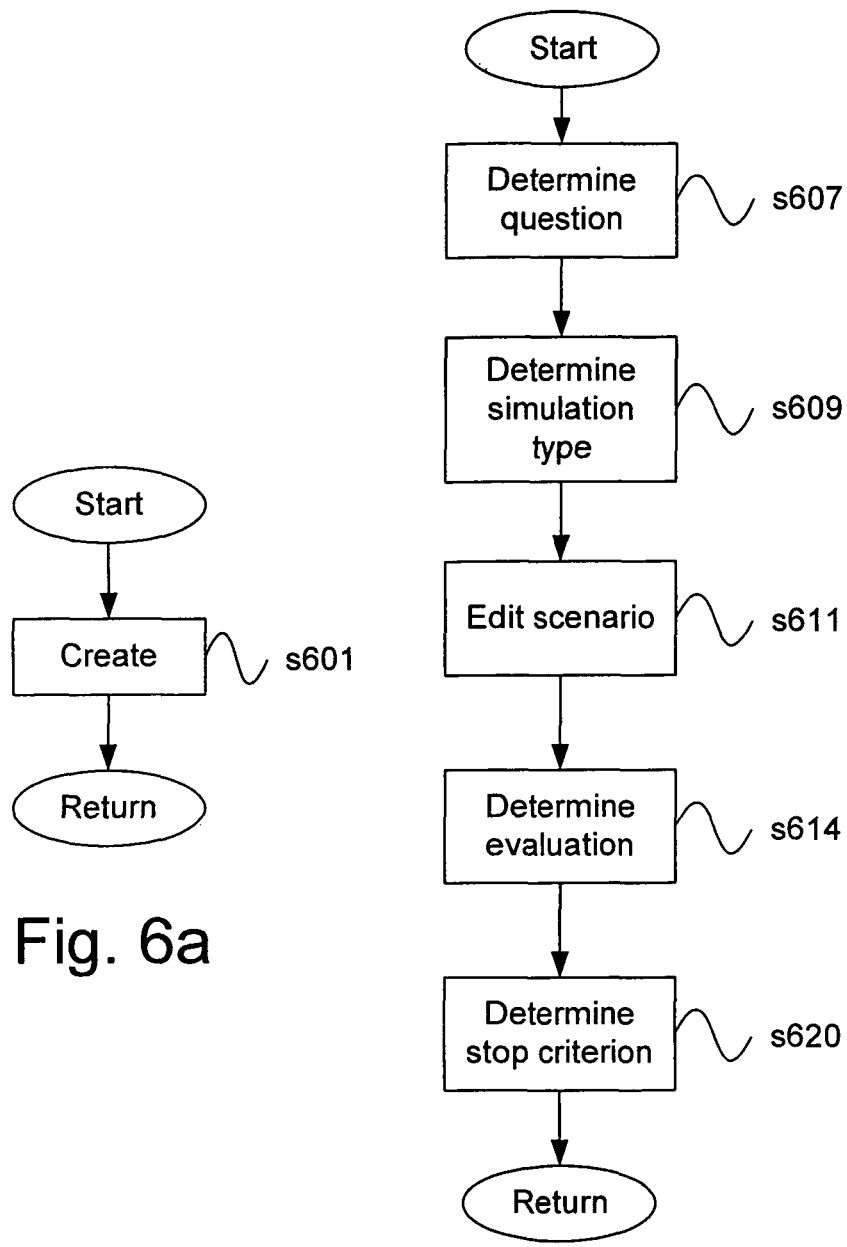
FIG. 6a schematically illustrates a communication method according to an aspect of the invention.
FIG. 6b schematically illustrates a communication method in greater detail according to an aspect of the invention.

An aspect of the invention relates to a computer programme comprising a programme code for performing the method steps depicted with reference to FIGS. 6a and 6b, respectively, when the computer programme is run on a computer.

An aspect of the invention relates to a computer programme product comprising a program code stored on computer-readable media for performing the method steps depicted with reference to FIGS. 6a and 6b, respectively, when the computer programme is run on the computer.

An aspect of the invention relates to a computer programme product directly storable in an internal memory of a computer, comprising a computer programme for performing the method steps depicted with reference to FIGS. 6*a* and 6*b*, respectively, when the computer programme is run on the computer.

FIG. 6*a* schematically illustrates a method according to an aspect of the invention. A first method step s601 relates to a method for generating input information associated with a question to be provided to a simulation device on-board a platform, comprising the sub steps of:

electing said question among a plurality of questions;
determining a simulation type corresponding to said simulation;
modifying a simulation scenario depending upon said question;
generating the input information depending upon the elected question and the simulation type.

The simulation type is a simulation criterion.

Preferably the step of:
modifying the simulation scenario is depending upon said simulation type.

Preferably the step of:
generating an evaluation criterion associated with said question is depending upon said simulation type.

Preferably the step of:
generating a stop criterion associated with said question is depending upon said simulation type.

Preferably the step of:
determining the simulation type among a group comprising real-time simulation, simulation involving an estimation process and a simulation involving a prediction process. Four simulation types are preferable, namely static simulation/calculation (answer to a static question), dynamic simulation (wherein updated input data is provided by different sensors of the platform), dynamic simulation (wherein a time rate is larger than 1.0) and simulation based on historical data.

Preferably the step of:
modifying the simulation scenario regarding a number of platforms is to be included in the simulation.

Preferably the step of:
modifying the simulation scenario regarding platforms is on an entity level, such as for example type of platform, categorisation "friend" or "hostile", behaviour, load, fuel, route etc.

Preferably the step of:
modifying the simulation scenario is regarding components and/or sub-systems of platforms of the simulation, such as for example sensors, weapons, dynamics etc.

FIG. 6*b* schematically illustrates a communication method in greater detail according to an aspect of the invention. This example relates to a procedure of preparing input information relevant for running a simulation so as to achieve an answer to a posed question within a platform. According to an embodiment of the invention only a first method step s607 is performed manually. The remaining steps of the method are performed automatically.

In a first method step s607 a question is determined, i.e. actively chosen from a dynamic list comprising a plurality of questions. Examples of questions are mentioned depicted above, for example with reference to FIG. 5. After the method step s607 a subsequent method step s609 is performed.

In the method step s609 a simulation order is determined. This means that a specific type of simulation type/category is associated with the specific determined question. Also with reference to FIG. 5, for example, four different types of simulations, each relating to a particular type of question is depicted. Generation of the associated simulation type/category is performed depending upon the determined question. After the method step s609 a subsequent method step s611 is performed.

In the method step s611 editing of the simulation scenario is performed. This step comprises one or more steps of adding new, fictive platforms to the simulation model. Additionally, one or more steps of deleting registered platforms from the simulation model. Editing of the simulation scenario is also performed regarding platforms on an entity level, such as type of platform, categorisation "friend" or "hostile", behaviour such as attack behaviour, fighter behaviour, or civil behaviour (civil regulations), load, fuel, route etc. Editing of the simulation scenario is also performed regarding components and/or sub-systems of registered platforms, for example sensors, weapons, dynamics etc. After the method step s611 a subsequent method step s614 is performed.

In the method step s614 an evaluation criterion is determined. The evaluation criterion is determined depending upon the determined question to be posed. An example of the evaluation criterion is current fuel status. Another example of the evaluation criterion is "number of hostile airplanes shot down>0". After the method step s614 a subsequent method step s620 is performed.

In the method step s620 a stop criterion of the simulation is determined. An example of the stop criterion is that the simulation running time is defined, for example 0.1, 1, 10, 20 or 30 seconds. After the method step s620 the method ends.

Procedure of creating/adding new questions to the question list

According to an embodiment of the invention new questions may be added to the list by creating default settings regarding for example simulation type, scenario editing, evaluation criterion and stop criterion, associated with a new, specific question. It should be noted that this can be performed on-line. Thus, a fast and simple procedure of creating new questions to be posed to the simulation device is provided.

Deletion of already questions is according to an embodiment of the invention performed by simply giving a command of deletion regarding the specific question to be removed from the question list.

Procedure of modifying present questions of the question list

According to an embodiment of present invention a question of the list may be modified. By activating a specific question it can be modified regarding for example simulation type, scenario editing, evaluation criterion and stop criterion already associated therewith.

Figure 7:
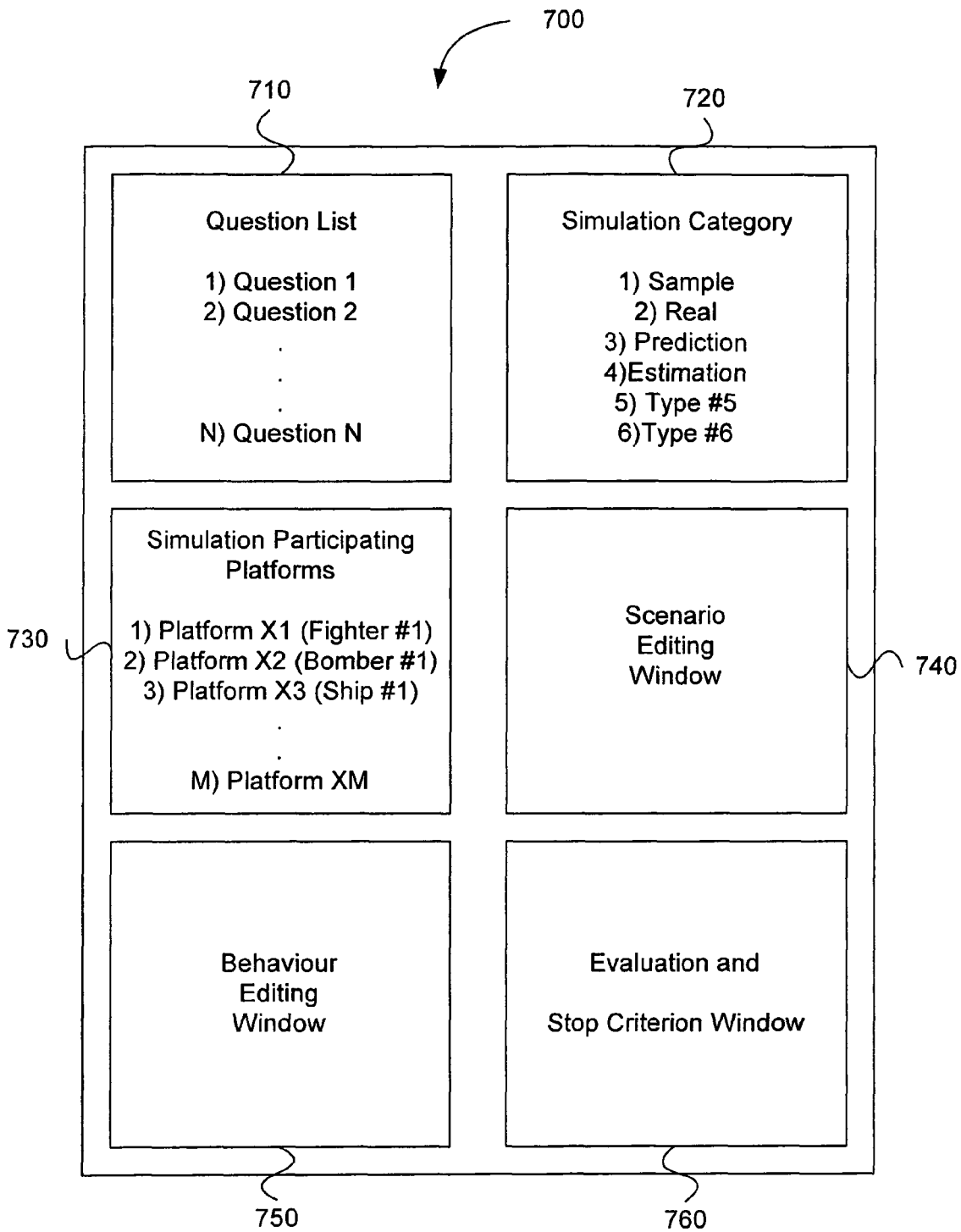
FIG. 7 schematically illustrates a user interface of the communication terminal according to an aspect of the invention.

FIG. 7 schematically illustrates a user interface 700 of the communication terminal according to an aspect of the invention.

According to this example the interface is a touch-screen having six basic windows. By use of the different windows a specific question may be simulated, for example by activating one of the pre-generated questions listed in a question list window 710.

Other windows presented in this simplified example are:
Simulation Category Window 720 arranged for determining a simulation type.
Simulation Participating Platforms Window 730 arranged for adding/deleting entities of the simulation.
Scenario Editing Window 740 arranged for editing e.g. platforms on an entity level, such as type of platform, categorisation "friend" or "hostile", load, fuel, route etc.
Behaviour Editing Window 750 arranged for editing behaviours of different platforms of the simulation. The window 750 may further be arranged for editing of the simulation scenario regarding components and/or sub-systems of registered platforms, for example sensors, weapons, dynamics etc. Evaluation and Stop Criterion Window 760 is arranged to provide allowance for the user to determine evaluation and simulation stop criterion.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated.

The invention claimed is:

1. A method for generating input information associated with a question relating to at least one of a situation analysis or choice of tactics to be provided to a simulation device so as to generate an answer to the question on-board a platform, the method comprising:
electing said question to be answered by a simulation among a plurality of questions utilizing a communication unit configured to permit inputting of said elected question to the simulation device;
inputting said elected question to the simulation device;
determining with the simulation device depending on the inputted elected question a simulation criterion corresponding to said simulation based on one member of a group comprising real-time simulation, simulation comprising an estimation process, or simulation comprising a prediction process;
copying with the simulation device a continuously updated environmental model comprising information relating to existing entities in an environment of the platform based on sensor data, upon inputting said elected question, wherein copying the continuously updated environmental model is performed depending upon a time when the elected question is inputted;
preparing with the simulation device a simulation scenario by applying at least one default model to the entities of the copy of the environmental model, depending on said inputted elected question, wherein the at least one default model comprises at least one characteristic associated with representations of the entities;
performing a matching procedure so as to identify the at least one default model based on measured sensor data and pre-stored sensor data in order to provide the environment model with information about different aircraft models;
modifying with the simulation device the simulation scenario regarding the entities of the copy of the environmental model depending upon said inputted elected question; and
generating with the simulation device the input information depending upon the inputted elected question, said input information comprising the modified scenario, and the simulation criterion so as enable generating the answer to the inputted elected question utilizing the simulation device on-board the platform, based on said generated input information.

2. The method according to claim 1, further comprising:
modifying the simulation scenario depending upon the simulation criterion.

3. The method according to claim 1, further comprising:
generating an evaluation criterion associated with said question depending upon said simulation criterion.

4. The method according to claim 1, further comprising:
generated a stop criterion associated with said question depending upon said simulation criterion.

5. The method according to claim 1, further comprising:
modifying the simulation scenario regarding a number of platforms to be included in the stimulation.

6. The method according to claim 1, further comprising:
modifying the simulation scenario regarding platforms on an entity level.

7. The method according to claim 1, further comprising:
modifying the simulation scenario regarding components and/or sub-systems of platforms of the simulations.

8. The method according to claim 1, further wherein the simulation criterion is a simulation type.

9. An arrangement for generating input information associated with a question relating to least one of situation analysis or choice of tactics to be provided to a simulation device on-board a platform, the arrangement comprising:
a communication unit configured to carry out at least one of inputting or selecting said question to be answered, wherein said communication unit comprises a user interface configured to permit a user to carry out at least one of inputting or selecting said elected question to the simulation device;
a determining unit of the simulation device configured to determine based on the imputed elected question a simulation criterion corresponding to said simulation, based on one member of a group comprising real-time simulation, simulation involving an estimation process, simulation involving a prediction process, said simulation criterion being associated with the inputted elected question;
a copy unit of the simulation device configured to copy a continuously updated environmental model comprising information relating to existing entities in an environment of the platform based on sensor data, upon inputting said elected question, wherein copying the continuously updated environmental model is arranged to be performed depending upon a time when the elected question is inputted;
a preparing unit of the simulation device configured to prepare a simulation scenario by applying at least one default model to the entities of the copy of the environmental model, depending on said inputted elected question, wherein the at least one default model comprises at least one characteristic associated with representations of the entities, and wherein the preparing unit is configured to perform a matching procedure so as to identify the at least one default model based on measured sensor data and pre-stored sensor data in order to provide the environment model with information about different aircraft models;
a first modification unit of the simulation device configured to modify the simulation scenario regarding the entities of the copy of the environmental model depending upon said inputted elected question; and
an input generator unit of the simulation device configured to generate the input information depending upon the inputted elected question, said input information comprising the modified scenario and the simulation criterion, wherein said generated input information is provided so as enable generating the answer to the inputted elected question utilizing the simulation device on-board the platform, based on said generated input information.

10. The arrangement according to claim 9, further comprising:
a second modification unit configured to modify the simulation scenario depending upon said simulation criterion.

11. The arrangement according to claim 9, further comprising:
an evaluation unit configured to generate an evaluation criterion associated with said question depending upon said simulation criterion.

12. The arrangement according to claim 9, further comprising:
a stop unit configured to generate a stop criterion associated with said question depending upon said simulation criterion.

13. The arrangement according to claim 9, further comprising:
a second modification unit configured to modify the simulation scenario regarding a number of platforms to be included in the simulation.

14. The arrangement according to claim 9, further comprising:
a second modification unit configured to modify the simulation scenario regarding platforms on an entity level.

15. The arrangement according to claim 9, further comprising:
a second modification unit configured to modify the simulation scenario regarding components and/or sub-systems of platforms of the simulation.

16. The arrangement according to claim 9, further wherein the simulation criterion is a simulation type.

17. A computer program product, comprising:
a non-transitory computer readable medium; and
program code recorded on the computer readable medium and executable by a processor for performing a method for generating input information associated with a question relating to at least one of a situation analysis or choice of tactics to be provided to a simulation device so as to generate an answer to the question on-board a platform, the method comprising:
electing said question to be answered by a simulation among a plurality of questions utilizing a communication unit configured to permit inputting of said elected question to the simulation device;
inputting said elected question to the simulation device;
determining depending on the inputted elected question a simulation criterion corresponding to said simulation based on one member of a group comprising real-time simulation, simulation comprising an estimation process, or simulation comprising a prediction process;
copying a continuously updated environmental model comprising information relating to existing entities in an environment of the platform based on sensor data, upon inputting said elected question, wherein copying the continuously updated environmental model is performed depending upon a time when the elected question is inputted;
preparing a simulation scenario by applying at least one default model to the entities of the copy of the environmental model, depending on said inputted elected question, wherein the at least one default model comprises at least one characteristic associated with representations of the entities;
performing a matching procedure so as to identify the at least one default model based on measured sensor data and pre-stored sensor data in order to provide the environment model with information about different aircraft models;
modifying the simulation scenario regarding the entities of the copy of the environmental model depending upon said inputted elected question; and
generating the input information depending upon the inputted elected question, said input information comprising the modified scenario, and the simulation criterion so as enable generating the answer to the inputted elected question utilizing the simulation device on-board the platform, based on said generated input information.

18. The method according to claim 6, wherein type of platform, categorization friend or hostile, behavior, load, fuel, or route are modified.

19. The method according to claim 7, wherein sensors, weapons, or dynamics are modified.

20. The arrangement according to claim 14, wherein type of platform, categorization friend or hostile, behavior, load, fuel, or route are modified.

21. The arrangement according to claim 15, wherein sensors, weapons, or dynamics are modified.

* * * * *